United States Patent [19]

Jeal

[11] 4,114,508

[45] Sep. 19, 1978

[54] SELF-DRILLING SCREW

[75] Inventor: Harvey Philip Jeal, Stevenage, England

[73] Assignee: Aerpat A.G., Zug, Switzerland

[21] Appl. No.: 758,450

[22] Filed: Jan. 10, 1977

[30] Foreign Application Priority Data

Jan. 9, 1976 [GB] United Kingdom ............... 780/76

[51] Int. Cl.² ............................................. F16B 25/00
[52] U.S. Cl. ........................................ 85/41; 408/228
[58] Field of Search .................. 85/41, 47, 68, 1 P; 408/228, 227, 226; 10/10 R

[56] References Cited

U.S. PATENT DOCUMENTS

| | | | |
|---|---|---|---|
| 3,093,028 | 6/1963 | Mathie | 85/41 |
| 3,207,024 | 9/1965 | Sommer | 85/47 |
| 3,358,548 | 12/1967 | Dyslin | 85/47 |
| 3,884,117 | 5/1975 | Eager | 85/47 |
| 3,937,120 | 2/1976 | Munse | 85/47 |

Primary Examiner—Ramon S. Britts
Attorney, Agent, or Firm—Oblon, Fisher, Spivak, McClelland & Maier

[57] ABSTRACT

A drill embodied in a self-drilling and self-tapping screw has a drill-point comprising a first sharp-pointed tip on the drill axis and a second sharp-pointed tip offset transversely of and axially behind the first tip. First and second cutting edges are inclined similarly to the axis on opposite sides thereof and have the first and second tips respectively at their respective leading ends.

1 Claim, 10 Drawing Figures

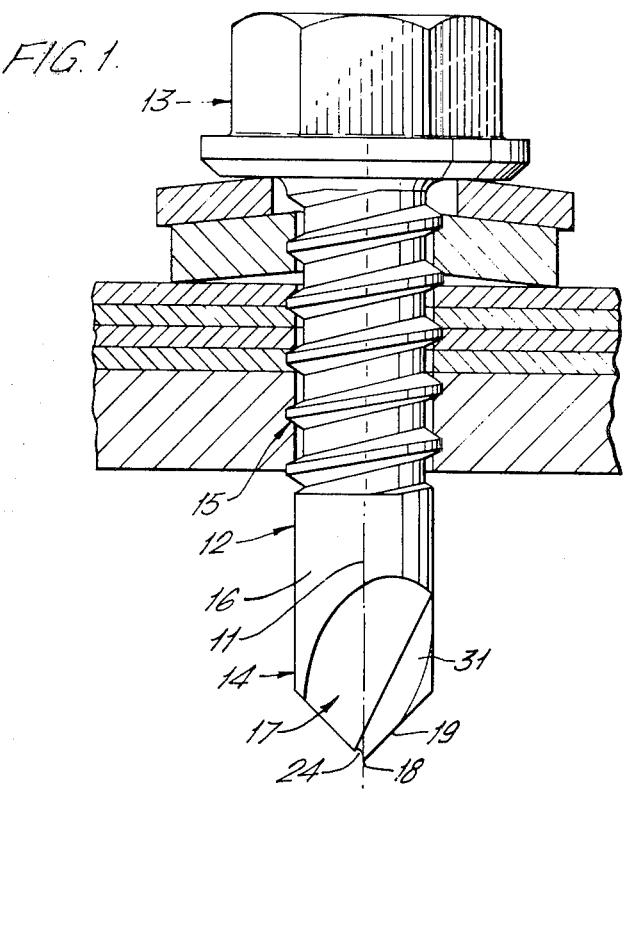
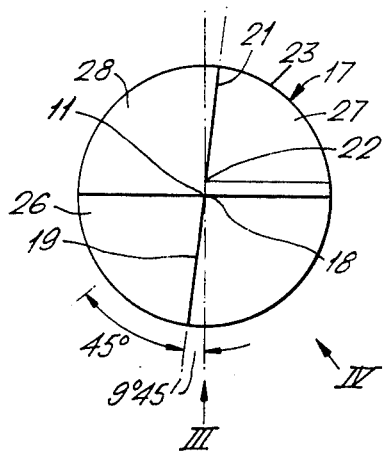
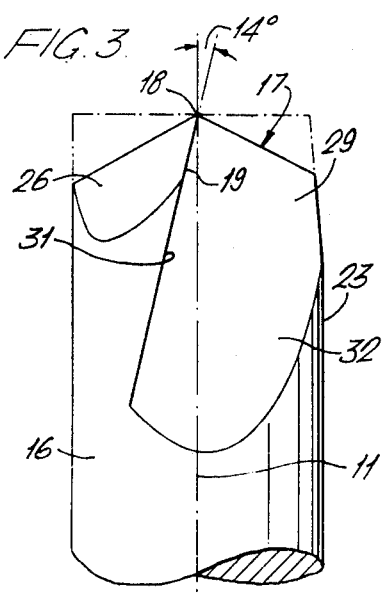
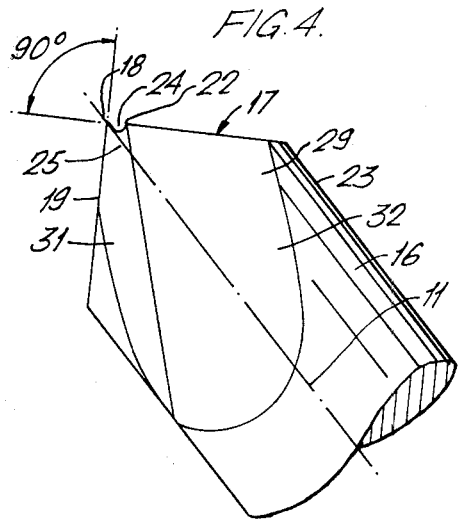

SELF-DRILLING SCREW

BACKGROUND OF THE INVENTION

1. Field of the Invention

The invention relates to a drill, more particularly to the entering-end portion of a drill. Specifically the invention may be applied to a drill embodied in a self-drilling and self-tapping screw.

2. Description of the Prior Art:

Prior-art drills commonly have an entering-end or drill-point configuration which is chisel-shaped, i.e. has an end ridge transverse to the drill axis. The same is also true of prior-art self-drilling and self-tapping screws, for example as disclosed in U.S. Pat. No. 3,789,725. Any such chisel-end drill point will "walk" across the workpiece surface, by successive contacts alternately of the two ends of the ridge, if the drill is presented to the surface without rigid sideways support and other than aligned exactly perpendicular to the surface, which two problems are normally unavoidable in use of handheld tools. Furthermore, the chisel-end tends to rub the workpiece material rather than cut it.

Applicant is aware of proposals made in U.S. Pat. No. 3,079,831 and U.S. Pat. No. 3,937,120, to provide the entering end of a drill with two sharp points spaced apart transversely of the drill axis. However, both these proposals teach that the two points are level with each other along the drill axis and are equally spaced transversely from the drill axis. Consequently, if such a drill is presented to the workpiece surface without rigid sideways support and not aligned exactly perpendicular to the surface, the same problem of the drill entering-end "walking" sideways across the surface will still be encountered, due to successive contacts alternately of the two points with the workpiece surface.

SUMMARY OF THE INVENTION

It is an object of the present invention to overcome this problem. The invention provides a drill comprising a shank rotatable about a longitudinal axis and including an entering end portion, the entering end portion comprising:

a sharp pointed tip lying substantially on the longitudinal axis of the shank;

a first cutting edge inclined to the longitudinal axis of the shank and extending from the tip at the leading end of the first cutting edge to the periphery of the entering end portion; a second cutting edge inclined to the longitudinal axis of the shank similarly to the first cutting edge and on the side thereof opposite to the first cutting edge and extending from a leading end to the periphery of the entering end portion, the leading end being offset from the tip both radially outwardly of and rearwardly longitudinally along the shank axis, and the axial extent of the second cutting edge being greater than one half of the axial extent of the first cutting edge.

The sharp pointed tip presents a single point to the workpiece surface, on initial contact, which can dig into the surface without "walking". The first cutting edge starts cutting a hole which is sufficiently deep to stabilize the drill by the time the second cutting edge reaches the workpiece surface.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

A specific embodiment of the invention will now be described by way of example and with reference to the accompanying drawings, in which:

FIG. 1 shows an elevation of a self-drilling and self-tapping screw inside sheets in which the screw is being inserted;

FIG. 2 is an end elevation of the entering end of the drillpoint of the screw;

FIGS. 3 & 4 are elevations taken in the directions of the arrows III and IV, respectively, of FIG. 2;

DESCRIPTION OF THE PREFERRED EMBODIMENT

Figure 5:
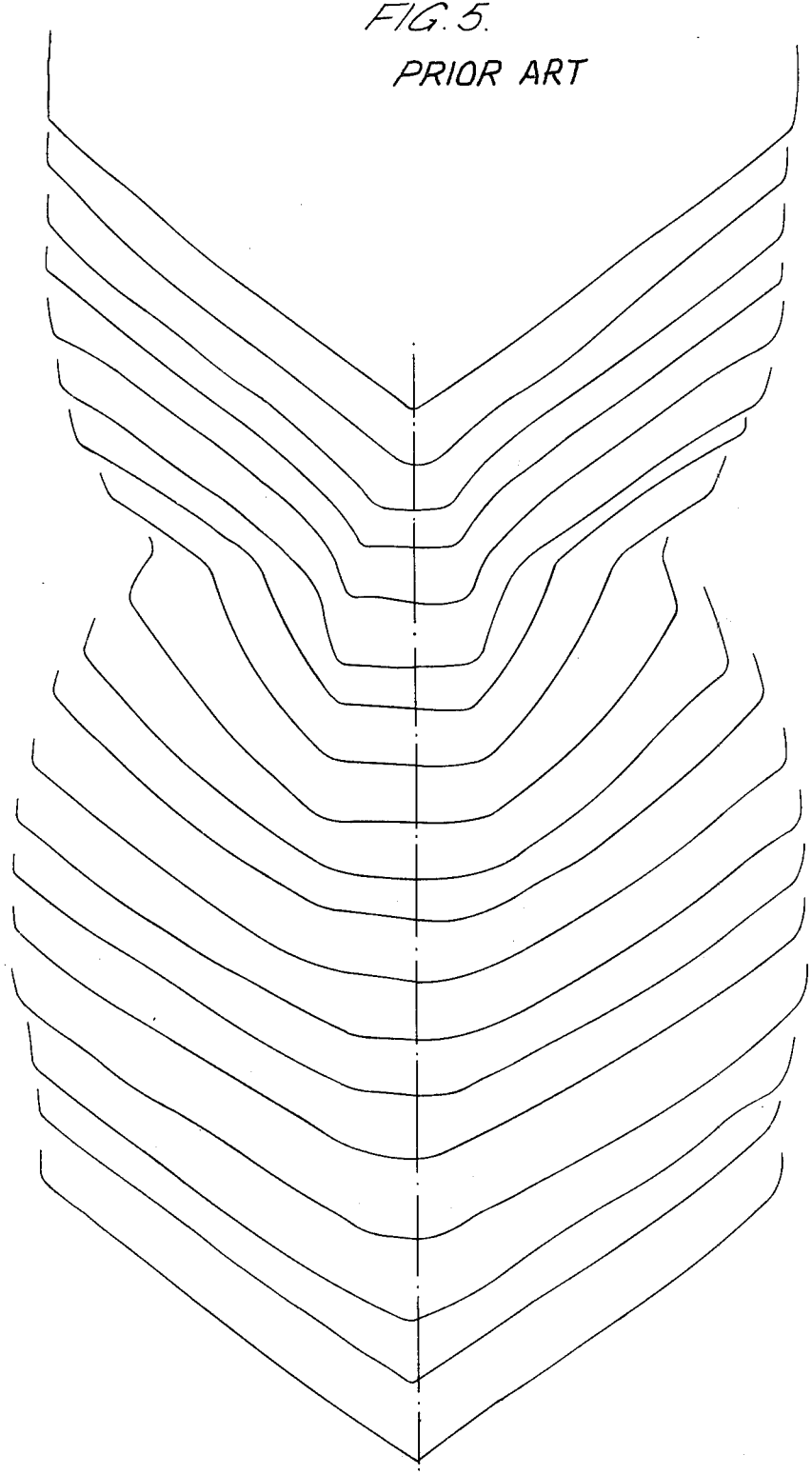
FIGS. 5, 6 and 7 show profiles of rotation of, respectively, the point of a standard prior-art drill-point, the point of a prior-art self-drilling and tapping screw, and the point of the drill of the present example.

The self-drilling and self-tapping screw of the present invention shown in FIG. 1 and has generally circular symmetry about an axis 11. It comprises a shank 12 having a head 13 at one end, a drill portion 14 at the other end, and self-tapping thread convolutions 15 intermediate the head 13 and the drill portion 14.

The drill portion 14 is shown in more detail in FIGS. 2 to 4. It comprises a drill shank 16 which is part of the screw shank 12 and has generally circular symmetry about the same axis 11. The shank 16 includes an entering end portion 17. The entering end portion 17 comprises a first sharp pointed tip 18, a first cutting edge 19, and a second cutting edge 21. The leading end of the second cutting edge 21 is provided by a second sharp pointed tip 22. (The terms "leading", "entering", "in front of" and "behind" are used herein related to the direction of advancement of the drill, i.e. along the axis 11 in the direction from the head 13 of the screw towards the first tip 18).

The first sharp pointed tip 18 lies substantially on the shank axis 11. The first cutting edge 19 is inclined to the axis 11 at an angle of $54\frac{1}{2}°$, and extends from the first tip 18 at its leading end to the outer periphery of the entering end portion, which is defined by the cylindrical surface 23 of the entering end portion (which in this example has the same radius as the shank 16). The axis of this cylindrical surface 23, is, of course, the axis 11.

The second cutting edge 21 is also inclined to the axis 11 at $54\frac{1}{2}°$ and is diametrically opposite to the first cutting edge 19. The second cutting edge 21 extends from the second tip 22 at its leading end to the periphery of the entering end portion. The leading end of the second cutting edge, i.e. the second tip 22, is offset radially outwardly from the shank axis 11, and is also offset behind the first tip 18. The radially outer ends of both cutting edges 19 and 21 both lie in a common plane perpendicular to the axis 11. The length of the second cutting edge 21 is substantially more than half of the length of the first cutting edge 19, and in this example the length of the second cutting edge 21 is about 90% of the length of the first cutting edge 19.

Between the first tip 18 and the second tip 22 is a small gap or void 24. The edge 25 of the material of the drill which lies between the first and second tips (and which, in use of the drill, might be effective as a cutting edge) all lies axially behind a straight line joining the first and second tips (which line is in fact an extension of the line of the second cutting edge 21). It will be seen that the second cutting edge 21 is symmetrical about the axis 11 with the first cutting edge 19 except for a missing portion, adjacent to the first tip 18, where the gap 24 exists.

The drill of this example is of course a right-handed (i.e. clockwise rotating) one. Trailing the first cutting edge 19 is a first flat face 26, and trailing the second cutting edge 21 is a second flat face 27. Betweeen the flat 26 and the second cutting edge 21 is a first flute or chip clearance void 28, and similarly between the flat 27 and the first cutting edge there is a second flute 29. The flute 29 is seen in FIGS. 3 & 4 and has a flat face 31 which has a negative rake angle of 14°, and a curved face 32. The other flute 28 is, of course, similar. The flat face of each flute intersects the associated end flat 26 or 27 to provide the cutting edge 19 or 21.

In manufacture of the drill, each flute is cut by passing a suitable rotating cutter through the entering end portion, the cutter arc producing the curved flute faces and the end of the cutter providing the flat flute face. The axis of the cutter is inclined at 14° to a plane perpendicular to the drill shank axis in order to provide the 14° negative rake angle. The two flats 26, 27 are cut in a separate operation after cutting of the flutes. The chain-line in FIG. 3 shows the profile of the blank before the cutting of the flats 26 and 27. The flute forming cutter is so aligned with respect to the shank that the curved face of the first flute 28, the flat face 31 of the second flute 29, and the flat end face 26 intersect on (or substantially on) the shank axis 11 to define the first sharp pointed tip 18, and so that the curved face 32 of the second flute, the second flat end face 27 and the flat face of the first flute intersect off the axis to define the second sharp pointed tip 22. The alignment is also such that the line of greatest slope of each end flat 26, 27 makes an angle of 45°(on a plane perpendicular to the axis, not on the plane of the flat) with the associated cutting edge 19, 21 as illustrated in FIG. 2.

The size of the gap 24 will depend upon the relationship between the radius of the flute cutter arc and the radius of the shank. The radial offset of the second tip 22 from the axis 11 is chosen in dependence upon the drill shank diameter. Depending on the sharpness of the flute cutter and the ductility of the metal of the drill shank, the drill as manufactured may have a very thin web of metal left in the gap 24. However, in use of the drill, this thin web is far too weak to have any cutting effect and will break off soon after initial application of the drill point to a workpiece.

Figure 8:
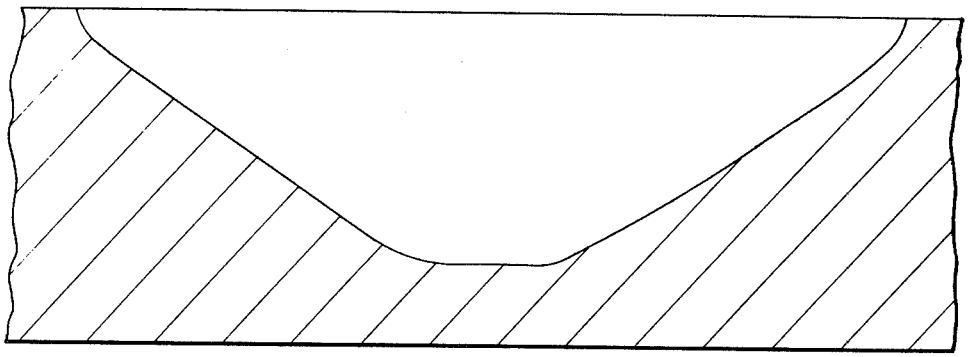
FIGS. 8, 9, and 10 correspond to FIGS. 5, 6 and 7 respectively, and show cross-sections through shallow holes drilled respectively by the points of the prior-art drill-point, the prior-art self-drilling and tapping screw, and the drill of the present example.

The advantage of the drill-point of the foregoing example is that it provides a single sharp pointed tip 18 for initial engagement with, and entry into, the surface of a workpiece, even if the drill is applied to the surface misaligned from the perpendicular to the surface and/or not sufficiently supported against sideways movement. Both of these adverse conditions are likely to be met when applying self-drilling and tapping screws to workpiece surfaces, since this is commonly done with a hand-held power tool. Prior-art drill-point configurations commonly have a chisel point, i.e. an end ridge edge transverse to the drill axis. This is illustrated in FIG. 5, which shows shadowgraph profiles taken at 10° intervals over 180° rotation of a standard "Dormer" drill, and in FIG. 8 which is a section through an actual shallow hole drilled by such a drill.

Figure 6:
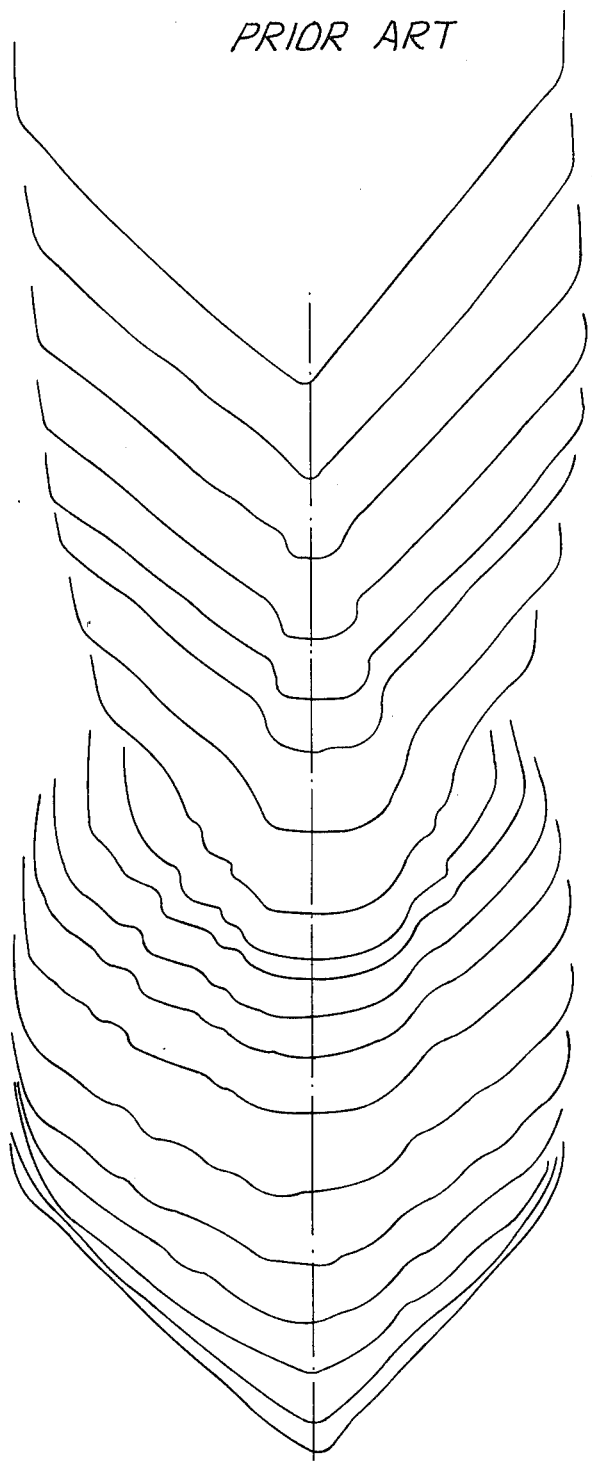
Figure 9:
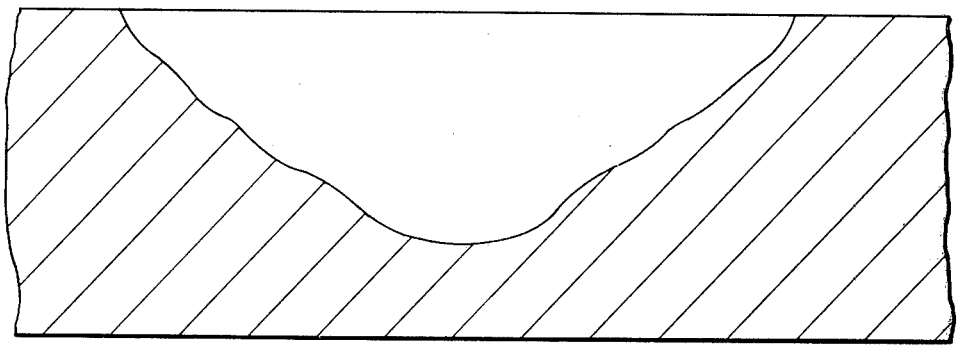

A similar entering-end configuration is common in prior-art self-drilling and tapping screws. FIGS. 6 and 9 illustrate the profile of, and holes drilled by, such screws. Any such chisel-end drill point will "walk" across the workpiece surface if the drill is presented to the surface without rigid sideways support and other than exactly aligned perpendicular to the surface. Furthermore, the chisel end tends to rub the workpiece material instead of cutting it.

Figure 7:
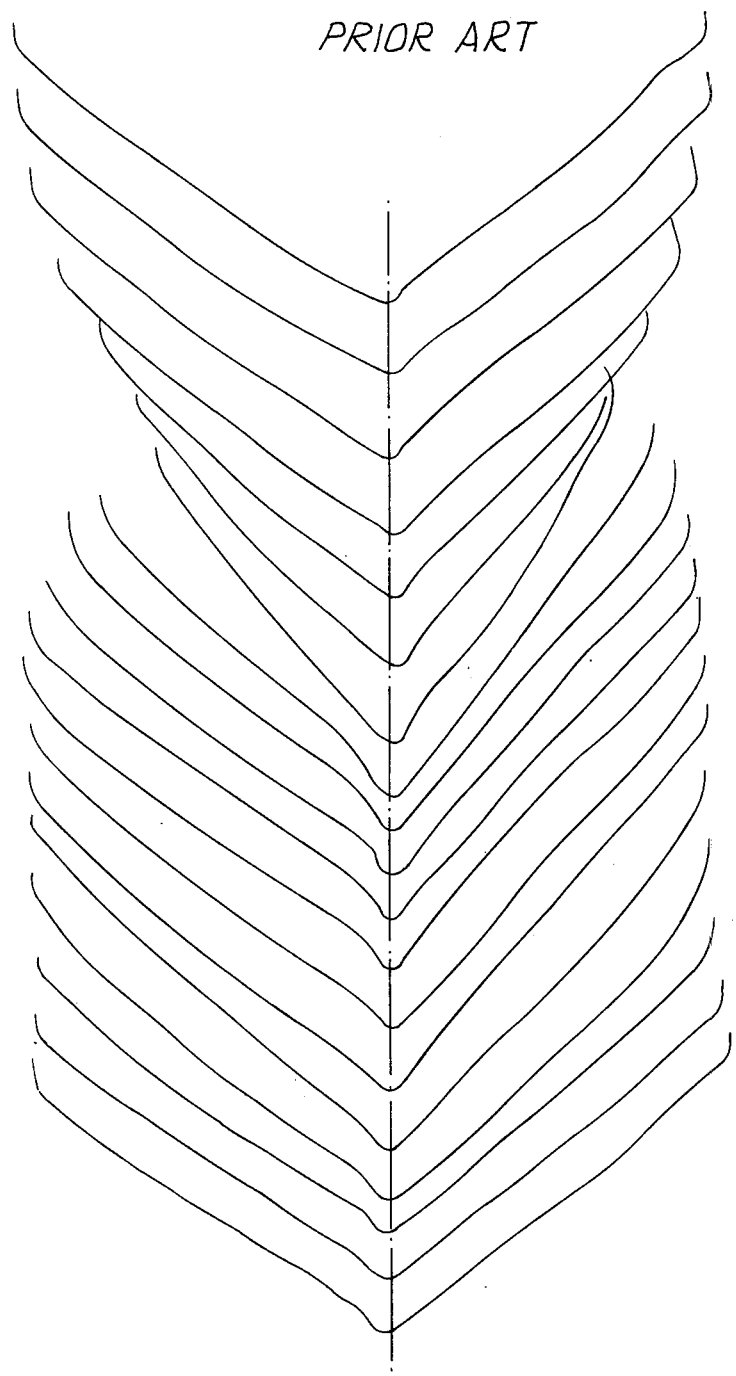
Figure 10:
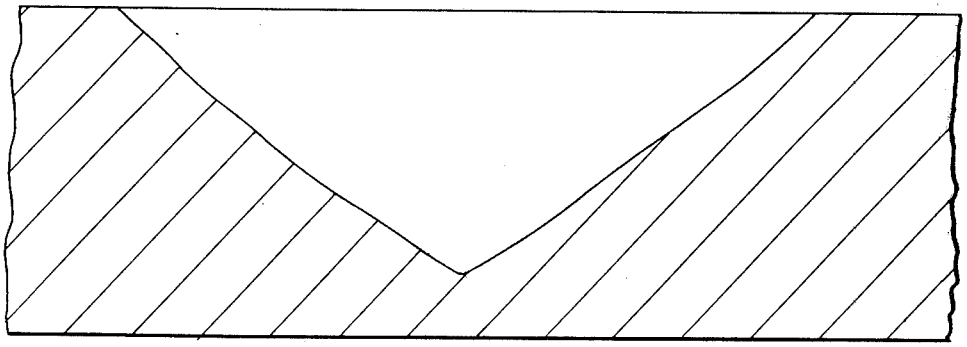

In contrast, the drill-point of the present invention presents a single sharp point to the workpiece surface on initial contact, which can dig into the surface and which therefore shows little or no tendency to "walk" sideways, even if not in perpendicular alignment and not rigidly supported. FIGS. 7 and 10 show respectively the profile of the drill point and the section through a shallow hole drilled by it.

When the drill point of the foregoing example is initially applied to a workpiece surface, the first sharp pointed tip digs into the the surface and the forward end of the first cutting edge cuts the start of the hole. The amount of imbalance in forces on the drill is so small relative to the mass of the drill and power tool as to be insignificant. As soon as the drill point has entered sufficiently for the second tip to reach the workpiece surface, the second cutting edge (which is symmetrical with the corresponding portion of the first cutting edge) also cuts the hole, and the forces on the drill-point are thus progressively restored to balance.

Although the invention has been described as applied to the point of self-drilling and tapping screw, it could of course be applied to a drill per se. However, it is particularly advantageous in a self-drill and tapping screw, because such screws are very frequently applied by hand-held power tools which are consequently misaligned and not rigidly supported.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A self-drilling and self-tapping screw comprising a shank having a self-tapping thread thereon and a head at one end, the shank being rotatable about a longitudinal axis and including an entering end portion at its opposite end, the entering end portion comprising:
   a single sharp pointed tip lying substantially on the longitudinal axis of the shank;
   a first cutting edge inclined to the longitudinal axis of the shank and extending from the tip at the leading end of the first cutting edge to the periphery of the entering end portion;
   and a second cutting edge inclined to the longitudinal axis of the shank substantially identically to the first cutting edge and on the side thereof opposite to the first cutting edge and extending from a leading end to the periphery of the entering end portion, the leading end being offset from the tip both radially outwardly of and rearwardly longitudinally along the longitudinal axis of the shank, the length the second cutting edge being greater than one half of the length of the first cutting edge the leading end of the second cutting edge inclined to the longitudinal axis being defined by a second sharp pointed tip.

* * * * *

UNITED STATES PATENT AND TRADEMARK OFFICE
CERTIFICATE OF CORRECTION

PATENT NO. : 4,114,508
DATED : September 19, 1978
INVENTOR(S) : Jeal

It is certified that error appears in the above-identified patent and that said Letters Patent are hereby corrected as shown below:

In the Drawings, Sheet 4, Figure 7, delete the heading "Prior Art".

Signed and Sealed this

Twenty-second Day of May 1979

[SEAL]

Attest:

RUTH C. MASON
Attesting Officer

DONALD W. BANNER
Commissioner of Patents and Trademarks